United States Patent Office 3,042,665
Patented July 3, 1962

3,042,665
PROCESS FOR POLYMERIZING VINYL CHLORIDE IN AQUEOUS SUSPENSION
Erwin M. Jankowiak, Midland, and Alfred R. Nelson, Bay City, Mich., assignors to The Dow Chemical Company, Midland, Mich., a corporation of Delaware
No Drawing. Filed May 13, 1959, Ser. No. 812,793
3 Claims. (Cl. 260—92.8)

This invention relates to a new process for polymerizing monomeric vinyl chloride alone or admixed with other copolymerizable monomers. More particularly, it relates to a suspension polymerization process which will produce such polymers in granular or bead form which are capable of absorbing greater amounts of plasticizer than has heretofore been possible, and which, when so plasticized, are free-flowing non-tacky beads.

This application is a continuation-in-part of U.S. Serial No. 548,763, filed November 23, 1955, now abandoned.

Processes for the polymerization of monomeric vinyl chloride in aqueous emulsion or in non-emulsified aqueous suspension, and for the copolymerization of monomeric vinyl chloride with other copolymerizable monomers, such as vinylidene chloride, have been known for a long time. For several purposes, the suspension polymerization techniques are preferred, since emulsion polymerization gives too fine particles for convenient use in molding or extrusion. The suspension processes usually employ a water-soluble or water dispersible granulating agent to cause the polymer to be in the form of small spheres which are small enough that they are easily handled but large enough to be free flowing. When no granulating agent is used, the polymerizing particles agglomerate into large hard lumps of polymer which must be ground before use. The optimum particle size for thermal fabrication operations is one which will pass through a 20 mesh screen (U.S. Sieve series) and rest on a 140 mesh screen. Regardless of the method used to prepare them, polyvinyl chloride particles usually must be plasticized before the polymer can be molded or extruded. Most physical forms of polyvinyl chloride and of the copolymers of vinyl chloride with other monomers, such as vinylidene chloride, do not absorb plasticizer readily at room temperature. Thus, it is found that with these polymers, as ordinarily produced, that the plasticizer does not penetrate into the polymer and is principally adsorbed on the outside of the polymer particle. Consequently, the resulting compositions suffer from the disadvantages of (1) non-uniformity of the composition which makes it difficult to fabricate them into uniform articles, (2) poor feed characteristics in the hoppers of extruders and other molding devices due to the wet or tacky polymer particles, and (3) insufficient plasticizer which makes the production of useful articles impossible under practical molding or extrusion conditions. In view of the above disadvantages it has been necessary to employ costly, time-consuming blending methods, often at elevated temperatures, if suitably plasticized polymer compositions based on the polymer of vinyl chloride or copolymers of vinyl chloride with vinylidene chloride were to be obtained. It would be most desirable if a polymerization process were available which would produce polymers of the type described with a high capacity for absorbing plasticizer and of such particle size distribution that they flow readily without the necessity of first grinding the polymers. By plasticizer absorbency is meant the ability of a polymer to absorb plasticizer without the aid of mechanical and thermal forces. It should be apparent that haloethylene polymers, such as polyvinyl chloride, are heat sensitive and that milling and other high temperature blending operations will seriously reduce the useful life of the polymer.

It is the principal object of this invention to provide an improved process for polymerizing monomeric vinyl chloride and for copolymerizing monomeric vinyl chloride with other copolymerizable monomers so that the resulting polymers are of a useful particle size distribution and are capable of absorbing large quantities of plasticizer at ordinary temperatures.

The above and related objects may be achieved by means of a process wherein an oil phase consisting of an oil-soluble polymerization catalyst and monomeric vinyl chloride or monomeric vinyl chloride and another copolymerizable monomer is dispersed in an aqueous phase consisting of water, certain cellulose ethers, certain wetting agents, and certain inorganic coagulating agents, in particular concentrations, and subjecting the dispersion to polymerization conditions. As a result of this process a polymer is produced which has a useful particle size distribution and a capacity for absorbing large quantities of plasticizer.

Although the amount of water used has little effect on the process, it is preferred to operate in the range of from 2 to 4 parts water per part of monomer, by weight. When less water is used there is insufficient heat transfer to carry away the heat of polymerization. When greater amounts of water are used the process becomes economically impractical.

The process may likewise be carried out at the normal temperatures of polymerization of vinyl chloride. Such temperatures usually fall in the range of from 25° to 65° C.

The catalysts used are oil-soluble peroxides such as benzoyl or lauroyl peroxides. Such catalysts are usually employed in suspension polymerization systems in amounts of from 0.1 to 5.0 percent by weight of the monomers. Within this range the amount of catalyst used has no effect on the plasticizer absorption characteristics or the particle size distribution of the polymers.

The cellulose ethers which may be employed are water-soluble methyl celluloses and methyl hydroxypropyl celluloses. Any viscosity grade of these cellulose ethers may be used although it is preferred to use the lower viscosity grades such as 10 cps. to 400 cps. The low viscosity grades of methyl cellulose and methyl hydroxypropyl cellulose are more easily dissolved in water than the higher viscosity grades. By viscosity grade as herein used is meant the viscosity of a 2 percent aqueous solution of the cellulose ether measured at 20° C.

The wetting agents that may be employed are those known to be ionic emulsifying agents for vinyl chloride in water. As is well known in the art, the various ionic emulsifiers differ in their emulsifying action toward any given monomer. There are numerous references to which the researcher may turn to find operable emulsifiers for vinyl chloride. Those emulsifiers selected from the anionic classification have been found to be most efficient and are preferred in carrying out the process. An emulsifier that has been found to be especially efficient is sodium lauryl sulfate of the grades marketed under the trade name of Duponol ME and Duponol C.

The coagulants that have been found to be useful in the instant process are those water soluble polyvalent metal salts wherein the metal ion has a valence greater than 1 and which salts are capable of insolubilizing the ionic emulsifier that is employed. By water soluble is meant that the concentration of salt needed in the process will dissolve in the amount of water present. Typical of the operable salts are calcium chloride, barium chloride, cadmium chloride, zinc chloride, magnesium chloride, aluminum sulfate, lead acetate and strontium nitrate. Other water soluble polyvalent metal salts will likewise work in the process to realize the stated objectives. It should be apparent to those skilled in the art that some polyvalent metal ions may exert an effect on certain physical and chemical properties of haloethylene polymers other than the plasticizer absorption. For example, copper ions and iron ions when present in significant concentration in a haloethylene polymer formulation are known to cause reduction in the stability of the polymer to prolonged heating or prolonged exposure to light. The concentration of such ions that will remain from their use in the instant process, however, is very small and will not negate the process. Even in the instances mentioned with copper and iron ions the adverse effects may be frequently overcome by the use or incorporation of suitable known stabilizers to the polymer formulation. However such metallic salts, although providing the desired plasticizer absorption, will usually not be used when it is desired to prepare polymers that will find their way into end uses that involve prolonged exposure to heat and light. The skilled worker will be able to make judicious selection of salt usually without resort to any prior experimentation.

The amounts of cellulose ether, wetting agent, and coagulant that may be used in this process may be varied within certain critical limits. Each of the substances may be employed in amounts of from 0.02 to 0.15 percent by weight, based on the weight of the monomer phase. When no cellulose ether is employed there is insufficient granulation and the resulting polymer is in the form of a mixture of large lumps and fine powder. When more is used the particle size is too small for practical handling and the polymer has little plasticizer absorbency. When the wetting agent is used in smaller amounts the resulting polymer has little plasticizer absorbency, and when used in greater amounts the particle size distribution is unsatisfactory. When no coagulant is used the plasticizer absorbency is greatly reduced and particle size distribution suffers and when greater amounts are employed the resulting polymer has too great an amount of residual salt remaining in it, causing extra difficult and expensive washing steps to be included in the process. It should therefore be apparent that the process of this invention requires a balance of three separate agents to obtain the desired product. Simple preliminary experiments will teach the researcher the optimum amounts within the specified range of the particular agents with which he is working to produce the polymer having the best particle size distribution and the highest plasticizer absorbency.

Although the order of addition of the various ingredients is not critical it is preferred to prepare the complete aqueous phase, including cellulose ether, emulsifier and salt, and then to add the monomer phase. In preparing the aqueous phase it has been found most convenient to solubilize the cellulose ether, then to add the wetting agent, and finally the coagulant. When all of the agents are added simultaneously it requires excessive amounts of mixing to obtain a solution.

The process is particularly advantageous when large reaction vessels are employed. In such vessels it is difficult to obtain an agitation pattern which is uniform throughout the vessel. In the past it was considered necessary to employ large amounts of a granulating agent to obtain a proper particle size distribution. However, large amounts such as 1 to 2 percent of a granulating agent cause a non-absorptive polymer to be produced. In a copending application by one of the present inventors Serial No. 488,703, dated February 16, 1955, is disclosed a process for using very small amounts of a cellulose ether alone as a granulating agent. That process produced a polymer having a satisfactory particle size distribution and having improved plasticizer absorbency over previous processes. The process of this invention produces a polymer in a satisfactory particle size distribution but having an even greater capacity for absorbing plasticizers, at about the same cellulose ether concentration. Some polymer particles when in finely divided form, such as those produced by extremely fine grinding, will take up large quantities of plasticizer by adsorption on the surface. Such adsorption causes the particles to be wet and to reduce their tendency to flow freely in hoppers and other feeding apparatus. The polymers of this invention will adsorb large quantities of plasticizer merely by soaking. The thus plasticized polymer particles are dry and free-flowing.

One of the known advantages of polymers prepared by suspension polymerization techniques over those prepared in emulsion has been a considerably greater bulk density or weight per unit volume of the particles. High bulk density is of considerable importance in shipping and storing polymers as well as affecting the feed characteristics of polymers in extrusion or other fabricating apparatus. Flocculant materials having low bulk density do not feed easily through hoppers and other standard feeding devices. The polymers of this invention have a high bulk density compared to the previous high plasticizer absorptive polymers which were prepared by emulsion techniques.

The advantages of the process will be more apparent from the following illustrative examples wherein all parts are by weight.

EXAMPLE 1

Into an upright cylindrical polymerization vessel having a capacity of 50 gallons and equipped with a coaxial agitator and jacketed for heating and cooling was charged 200 parts of water, 0.05 part of a water soluble methyl cellulose (50 cps. viscosity grade), 0.075 part of sodium lauryl sulfate, and 0.1 part of barium chloride. A monomer phase was prepared by adding 0.2 part lauroyl peroxide to 100 parts vinyl chloride and this monomer was dispersed in the previously prepared aqueous phase. Polymerization was initiated and maintained by heating the dispersion to 50° C. with agitation. After polymerization was complete the resulting polymer was washed with water and dried.

Additional polymerizations were made in a similar manner varying the amounts of cellulose ether, wetting agent, and coagulant as shown in Table I.

After drying the polymers their particle size distribution was determined using a nest of standard sieves. It is desirable to have a distribution so that the majority of the particles are of a size able to pass a 70 mesh sieve but be retained on a 140 mesh sieve. When the distribution was such the result in Table I is reported as satisfactory. When it was not it is reported as too fine or too coarse.

All of the polymers were tested for their plasticizer absorption by adding dioctyl phthalate slowly to 100 parts of polymer until the polymer showed signs of absorbing no more plasticizer. This was determined by removing a small portion of polymer periodically during the addition and placing it on absorptive paper. The appearance of a wet spot on the paper was taken as the endpoint. Additional plasticizer merely remained on the surface of the particles.

The plasticized polymers were checked for their flow properties. 100 parts of polymer were placed in a standardized funnel to simulate an extruder hopper. The time required for all of the polymer to flow through the funnel was determined.

The results of all of these tests are summarized in Table I.

*Table I*

| Cellulose Ether | | Wetting agent | Coagulant | Parts plasticizer absorbed per 100 parts polymer | Particle size distribution | Bulk density, g./cc. | Time to flow, sec. |
|---|---|---|---|---|---|---|---|
| Parts by weight | Viscosity | | | | | | |
| 0.05 | 50 | 0.075 | 0.10 | 70 | satisfactory | 0.24 | 11.8 |
| 0.15 | 10 | 0.075 | 0.05 | 70 | do | 0.28 | 10.7 |
| 0.08 | 10 | 0.04 | 0.08 | 51 | do | 0.35 | 7.6 |
| 0.08 | 10 | 0.02 | 0.04 | 35 | do | 0.33 | 8.3 |
| 0.03 | 50 | | | 25 | do | 0.31 | 14.5 |
| 0.16 | 50 | | | 18 | too fine | 0.35 | (¹) |

¹ Too wet to flow.

EXAMPLE 2

A series of samples was prepared in a manner similar to Example 1 except that the polyvalent metal salt was varied. The plasticizer absorbency of each example was determined and the results appear in Table II.

*Table II*

Plasticizer absorption
(parts per 100 parts
Wetting agent: polymer)
  Zinc chloride _____ 60–70
  Magnesium chloride _____ 58–68
  Lead acetate _____ 50–60
  Strontium nitrate _____ 60–70
  Calcium chloride _____ 55–65
For Comparative Purposes: None _____ 35–38

When the runs were repeated using only methyl cellulose as the dispersing agent the plasticizer absorption was found to be 35 parts per 100 parts of polymer.

EXAMPLE 3

A series of samples were prepared in a manner similar to Example 1 except that the wetting agent was varied. The plasticizer absorbency of each sample was determined and the results listed in Table III.

*Table III*

| Wetting Agent | | Plasticiser absorption (parts per 100 parts polymer) |
|---|---|---|
| Name | Type | |
| None | | 18 |
| Sodium alkyl sulfonate | anionic | 29 |
| Dihexyl ester of sodium sulfosuccinic acid | do | 29 |
| Dibutyl phenyl phenol sodium disulfonate | do | 47 |
| Monobutyl phenyl phenol sodium monosulfonate | do | 30 |
| Alkyl aryl sulfonate | do | 48 |
| Stearyl dimethyl benzyl ammonium chloride | cationic | 45 |
| For contrast: | | |
|   Sorbitan monolaurate | nonionic | 19 |
|   Sorbitan monooleate | do | 20 |

Similarly advantageous results were obtained with copolymers prepared from all proportions of vinyl chloride and vinylidene chloride as well as ternary polymers of vinyl chloride, vinylidene chloride, and alkyl acrylates.

By way of further contrast, when a polymerization was conducted under similar conditions but using only sorbitan monolaurate and methyl cellulose the resulting particle size was too fine and the plasticizer absorbency was the same as for a polymerization using a cellulose ether alone.

It appears that the success of the process depends on the formation of the insoluble colloidal reaction product formed between the polyvalent metal salt and the emulsifying agent.

EXAMPLE 4

In a similar contrasting vein a polymerization recipe consisting of 200 parts of water, 0.15 percent by weight of a water soluble methyl cellulose (10 cps. viscosity grade) 0.1 percent by weight of sodium lauryl sulfate, 0.2 percent by weight lauroyl peroxide and 100 parts by weight of vinyl chloride was agitated to cause dispersion. Polymerization was initiated and maintained by heating to 50° C. After polymerization was complete the resulting polymer was washed with water and dried. Another polymerization was conducted in identical manner except that the dispersing agent consisted of 0.15 percent by weight of the water soluble methyl cellulose, 0.075 percent by weight of the same sodium lauryl sulfate and 0.1 percent by weight of barium chloride. The polymerization procedure and post polymerization treatment were identical to the former. When tested according to the procedures of Example 1 the results showed that the polymer resulting from the comparative run had a plasticizer absorption of 33 parts plasticizer per 100 parts of polymer. The particle size distribution was such that there was a large amount of extremely fine material resembling spray dried latex particles. There likewise was a large amount of relatively coarse material. Microscopic examination showed many opaque particles which had absorbed no plasticizer. In contrast the polymerization conducted in accordance with the instant invention resulted in a product having a plasticizer absorption of 57 parts plasticizer per 100 parts polymer. The particle size distribution was uniform with no extremely fine nor extremely coarse fractions. Microscopic examination showed no evidence of any translucent unplasticized particles.

We claim:

1. A process for polymerizing a monomeric material composed predominantly of vinyl chloride comprising the sequential steps of dispersing said monomeric material containing catalytic quantities of an oil-soluble peroxide polymerization catalyst in an aqueous phase consisting essentially of from 2 to 4 parts by volume of water per part of monomer, from 0.02 to 0.15 percent by weight of said monomeric material of a water-soluble cellulose ether selected from the group consisting of methyl cellulose and methyl hydroxypropyl cellulose, from 0.02 to 0.15 percent by weight of said monomeric material of ionic emulsifying agent and from 0.02 to 0.15 percent by weight of said momomeric material of a water-soluble polyvalent metal salt coagulant for said emulsifier wherein said metal cation is of a metal having a valence greater than 1 and maintaining dispersion of the polymerizing particles with agitation at a temperature of from 25° to 65° C. until polymerization is complete, to produce substantially uniform, free-flowing particles having high capacity for plasticizer absorption.

2. The process claimed in claim 1, wherein the ionic emulsifying agent is anionic.

3. The process claimed in claim 1, wherein the emulsifying agent is sodium lauryl sulfate.

References Cited in the file of this patent

UNITED STATES PATENTS 2,528,469     Condo et al. _____ Oct. 31, 1950
2,689,836     Bier _____ Sept. 21, 1954